(12) United States Patent
Boehler et al.

(10) Patent No.: US 7,442,154 B2
(45) Date of Patent: Oct. 28, 2008

(54) MACHINE TOOL AND A METHOD FOR CHANGING THE TOOL IN A MACHINE TOOL

(75) Inventors: Harald Boehler, Echterdingen (DE); Stefan Bergmann, Aalen (DE); Markus Stanik, Albershausen (DE)

(73) Assignee: Ex-Cell-O GmbH, Eislingen/Fils (DE)

( * ) Notice: Subject to any disclaimer, the term of this patent is extended or adjusted under 35 U.S.C. 154(b) by 0 days.

(21) Appl. No.: 11/620,851

(22) Filed: Jan. 8, 2007

(65) Prior Publication Data

US 2007/0197361 A1   Aug. 23, 2007

Related U.S. Application Data

(63) Continuation of application No. PCT/EP2005/007423, filed on Jul. 8, 2005.

(30) Foreign Application Priority Data

Jul. 9, 2004   (DE) .................. 10 2004 034 932
Oct. 7, 2004   (DE) .................. 10 2004 050 035

(51) Int. Cl.
*B23Q 3/157* (2006.01)
*B23C 1/04* (2006.01)

(52) U.S. Cl. .................. 483/50; 483/55; 409/192; 409/213

(58) Field of Classification Search .................. 483/50, 483/54–57, 69, 14, 17, 20, 27, 28–29; 409/192, 409/203, 213, 217; 408/31, 34, 39, 43, 53; 29/563, 33 P, 27 C, 27 R; 82/129, 138; 451/178, 451/194; 83/404, 404.4
See application file for complete search history.

(56) References Cited

U.S. PATENT DOCUMENTS

| | | | |
|---|---|---|---|
| 4,499,650 A * | 2/1985 | Cannon et al. .................. 483/3 |
| 4,520,551 A | 6/1985 | Imhof | |
| 4,641,413 A | 2/1987 | Hallqvist | |
| 4,658,494 A * | 4/1987 | Ohtani et al. .................. 483/10 |
| 4,700,452 A | 10/1987 | Babel | |
| 4,706,371 A | 11/1987 | McMurtry | |
| 4,730,373 A | 3/1988 | Senoh | |
| 4,947,538 A | 8/1990 | McMurtry | |
| 4,949,443 A * | 8/1990 | Saruwatari et al. .......... 29/27 C |

(Continued)

FOREIGN PATENT DOCUMENTS

DE   35 39 662 A1   5/1987

(Continued)

OTHER PUBLICATIONS http://www.elha.de/en/fertigungsmodule/concept/merkmale.php—Description of FM3+X System, 11 pages.

*Primary Examiner*—Erica E Cadugan
(74) *Attorney, Agent, or Firm*—Alston & Bird LLP (57) ABSTRACT

In a machine tool comprising at least one tool carrier and at least one moveable workpiece carrier with which one or more workpieces are positionable for machining, a tool can be changed in a simple manner by providing a tool holding device connected to the at least one workpiece carrier.

11 Claims, 4 Drawing Sheets

U.S. PATENT DOCUMENTS

| | | | |
|---|---|---|---|
| 5,111,573 A * | 5/1992 | Ito et al. ........................ | 483/1 |
| 5,230,685 A * | 7/1993 | Christen et al. ............... | 483/55 |
| 5,803,886 A | 9/1998 | Schweizer | |
| 7,124,666 B2 * | 10/2006 | Feinauer et al. ............... | 82/121 |
| 2005/0139049 A1 | 6/2005 | Feinauer et al. | |

FOREIGN PATENT DOCUMENTS

| | | |
|---|---|---|
| DE | 890 30 33 U1 | 7/1990 |
| DE | 298 05 501 U1 | 6/1998 |
| DE | 298 15 125 U 1 | 6/1999 |
| DE | 199 06 014 A1 | 8/2000 |
| GB | 2271945 A * | 5/1994 |
| WO | WO2004012888 | 2/2004 |

* cited by examiner

MACHINE TOOL AND A METHOD FOR CHANGING THE TOOL IN A MACHINE TOOL

CROSS REFERENCE TO RELATED APPLICATIONS

This application is a continuation of PCT Application No. PCT/EP2005/007423, filed Jul. 8, 2005, and also claims the benefit of German Application No. 10 2004 034 932.0 filed Jul. 9, 2004, and German Application No. 10 2004 050 035.5 filed Oct. 7, 2004, all of which are incorporated herein by reference in their entirety and for all purposes.

BACKGROUND OF THE INVENTION

The invention relates to a machine tool comprising at least one tool carrier and at least one moveable workpiece carrier by means of which one or more workpieces are positionable for machining. Furthermore, the invention relates to a method for changing the tool in a machine tool.

A multi-spindle machine tool which comprises a machine frame, a first spindle carriage including a first workpiece spindle serving as a moveable workpiece carrier, and also a second spindle carriage including a second workpiece spindle serving as a further moveable workpiece carrier is known from WO 2004/012888 A1. The first spindle carriage and the second spindle carriage are guided in a linearly displaceable machine frame. Hereby, a first guide means and a spaced second guide means are arranged on the machine frame, both the first spindle carriage and the second spindle carriage being guided on said guide means. The first workpiece spindle and the second workpiece spindle are arranged between the two guide means.

SUMMARY OF THE INVENTION

In accordance with the present invention, a machine tool is provided with which a tool can be changed in a simple manner. In accordance with the present invention, a tool holding device (i.e., a tool retaining device) is connected to the at least one workpiece carrier. The tool holding device can thus be positioned by the workpiece carrier. A change of tool can be carried out automatically in that one or more tools or tool parts, which are held by the tool holding device, are moved to a tool changing position by the workpiece carrier. It is thereby possible to accomplish a change of tool even in cramped spatial conditions. It is also no longer necessary for an operator to gain access to the work space of the machine tool for the purposes of changing a tool. In particular, a cover for the work space does not have to be opened.

The tool holding device (and the tools held thereby) is moveable by the associated workpiece carrier. The tool holding device together with a tool held thereby can then be moved to a tool changing position or it can be moved in such a way that a tool can be picked up from a tool carrier. In accordance with the invention the workpiece carrier is used as the tool changing carriage. The solution in accordance with the invention can be employed, in particular, when one or more tool carriers are held in non-translatory manner on a machine frame such as a portal-like framework for example. In particular, the axes of movement of the tool holding devices are the axes of movement of the workpiece carrier. The constructional layout and the complexity of the control system for an automated tool changing process are thereby kept low.

It is expedient for the tool holding device to be positionable with respect to the at least one tool carrier by the workpiece carrier for the purposes of changing a tool. An automatic change of tool can thereby be effected. Tools released from a tool carrier can be removed or tools can be supplied to a tool carrier.

Provision may be made for the tool holding device to be fixable to the workpiece carrier in releasable manner. During a process of machining a workpiece wherein the workpiece is clamped to the workpiece carrier, the machining process cannot then be disturbed by the tool holding device. Whenever necessary, i.e., when a change of tools is to be carried out, the tool retaining device can be fixed to the workpiece carriage. For example, the tool holding device is adapted to be plugged onto the workpiece carrier. It can thereby be fixed to the workpiece carrier in a simple manner. Other manners of fixation are also possible such as a positive-fit type of fixation.

In one embodiment, there is provided a plurality of work stations where each work station comprises at least one tool carrier. In such a machine tool, differing machining operations can be carried out in different work stations. The workpieces are transported from work station to work station by the workpiece carrier. If there is a sufficient number of work stations then a change of tool only needs to be carried out when a tool is worn out. In particular, the work stations are arranged in fixed manner with respect to a machine frame.

For example, a plurality of tool carriers is arranged in a row. The translatory movements between different work stations are thereby kept small. It is also thereby possible for the space occupied by the machine tool to be kept small. Furthermore, a plurality of rows of tool carriers can be provided. The rows face each other for example. A machine tool making optimum use of space can thereby be realized.

It is quite especially advantageous if the workpiece carrier is moveable between the rows. A multiplicity of machining operations can thereby be carried out whilst the translatory movements can be kept small. In consequence, the space required by the machine tool can also be kept small.

Provision is made for the workpiece carrier to be moveable in a first direction, for example, in an X-direction which is aligned substantially horizontally. The degrees of movement can be increased if the workpiece carrier is moveable in a second direction which is transverse and in particular perpendicular to the first direction. The second direction may be a Y-direction. This is aligned, in particular, in parallel with the vertical axis.

If the workpiece carrier is moveable in a third direction which is transverse and in particular perpendicular to the first direction and is transverse and in particular perpendicular to the second direction, then the degrees of movement can be increased still further. The third direction may, in particular, be a Z-direction which can be a horizontal direction that is perpendicular to the X-direction. The workpiece carrier can also be driven out of a work space in the Z-direction due to the mobility thereof. Machined workpieces can thus be removed from the workpiece carrier in a simple manner or the latter can be reloaded in a simple manner. This also enables the tool holding device to be fixed to the workpiece carrier in a simple manner or enables the tool retaining device to be loaded or unloaded.

A further degree of movement for the workpiece carrier, and thus for the tool holding device, results if the workpiece carrier is rotatable. Workpieces (and also tools for the tool changing process) can thereby be positioned in a work space at angular positions relative to the tool holders.

It is expedient for a tool releasing device and/or a tool fixing device to be connected to the workpiece carrier. In this manner, the tool releasing device/tool fixing device can be realized by a single device. The tool releasing device or tool fixing device is then moveable with the workpiece carrier. A tool can be released from a tool holder by means of the tool releasing device. A tool can be fixed in a tool holder by means of the tool fixing device. The tool releasing device or tool fixing device can be formed integrally with the tool holding device.

It is expedient for at least one point for depositing one or more tool holding tools to be provided. The at least one depositing point is arranged, in particular, on a machine frame. Such a depositing point can serve as a storage location for the tool holding devices. The tool holding device can, for example, be equipped with one or more tools and placed down at a depositing point. Prior to or subsequent to the machining of a workpiece, a workpiece carrier having no workpiece held thereon can collect the tool holding device from the depositing point and feed it to the appropriate tool carrier. A change of tools can be effected there. The tool holding device together with the replaced tool is then guided back to the depositing point by the workpiece carrier. Subsequently, the workpiece carrier can collect a workpiece requiring machining by the new tool and feed it to the tool.

Furthermore, in accordance with the present invention a simple method for changing tools in a machine tool is provided. In accordance with the invention, a tool holding device is displaced (shifted) to a tool changing position by means of a workpiece carrier. The method in accordance with the invention comprises the advantages already described in connection with the machine tool in accordance with the invention. In particular, an automated tool changing process can be carried out without an operator having to reach into a work space. Further advantageous embodiments of the method in accordance with the invention have already been described in connection with the machine tool in accordance with the invention.

In particular, a tool or a tool part taken from a tool carrier is removed by the workpiece carrier or a tool or a tool part that is to be placed in a tool carrier is supplied by the workpiece carrier. Thus, an automated tool changing process can be carried out with the aid of the tool retaining device connected to the workpiece carrier.

The following description of a preferred exemplary embodiment serves to provide a more detailed explanation of the invention in conjunction with the drawings.

BRIEF DESCRIPTION OF THE DRAWINGS

In order to assist the understanding of certain embodiments of the invention, reference will now be made to the appended drawings, which are not necessarily drawn to scale, and wherein.

DETAILED DESCRIPTION OF THE INVENTION

The present invention now will be described more fully hereinafter. However, this invention may be embodied in many different forms and should not be construed as limited to the embodiments set forth herein; rather, these embodiments are provided so that this disclosure will satisfy applicable legal requirements. Like numbers refer to like elements throughout. As used in this specification and the claims, the singular forms "a," "an," and "the" include plural referents unless the context clearly dictates otherwise.

Figure 1:
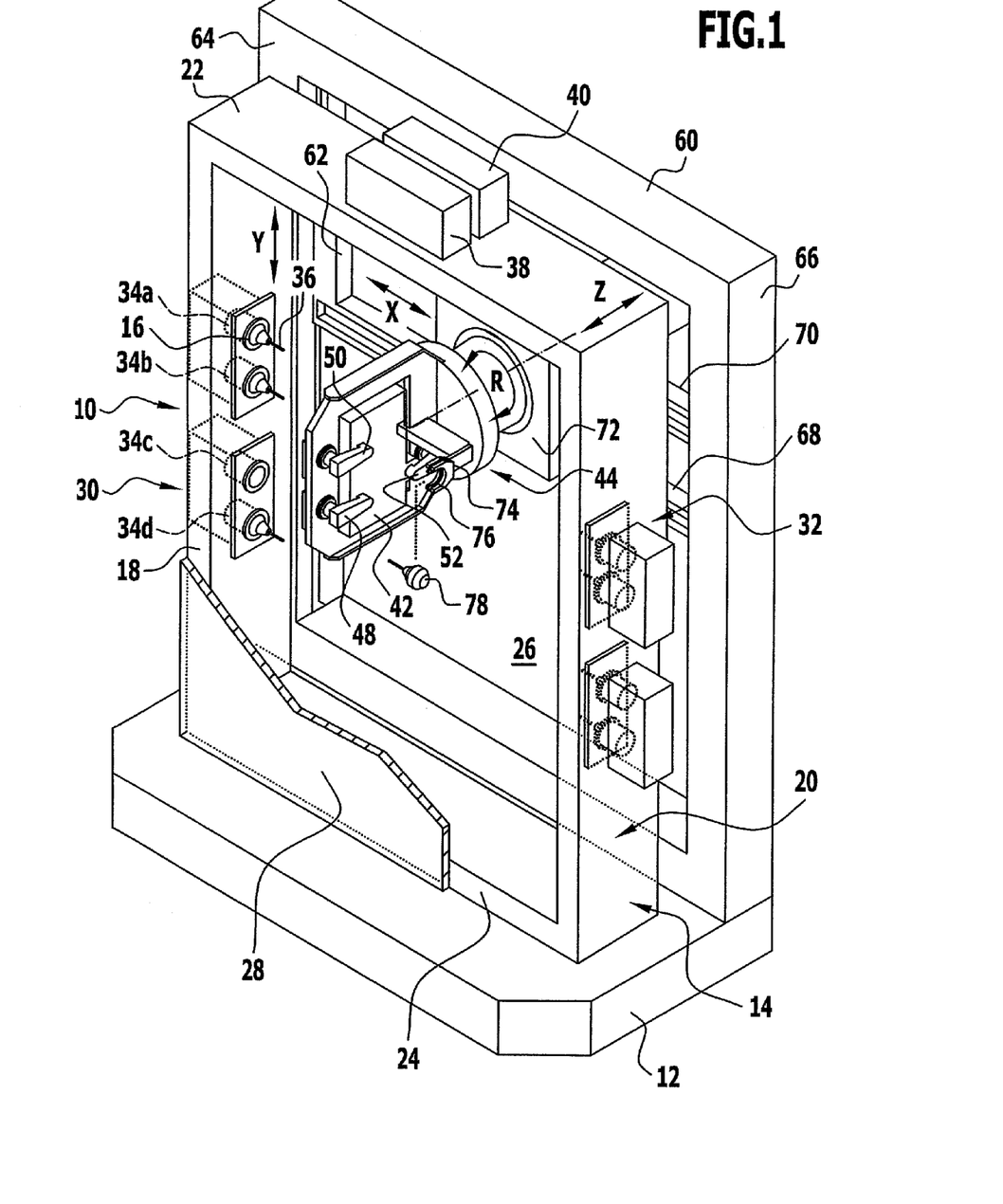
FIG. 1 is a perspective partial view of a first exemplary embodiment of a machine tool in accordance with the invention.

An exemplary embodiment of a machine tool in accordance with the invention, which is partly shown in FIG. 1 and bears the general reference 10 therein, comprises a machine bed 12. A framework 14, which holds a plurality of tool carriers 16, is seated on the machine bed 12. The framework 14 comprises opposed supports 18, 20 for example. These extend above the machine bed 12 in the vertical direction for example. The supports 18 are connected at their upper end by a transverse support 22. Provision may be made for the supports 18, 20 to be connected at the lower end thereof in the vicinity of the machine bed 12 by a further transverse support 24. A work space 26 for the process of machining the workpieces is formed between the supports 18, 20 and 22, 24. The work space 26 is in the form of a rectangular parallelepiped in the exemplary embodiment shown. The work space 26 is covered at one front side by a cover 28, which is partially shown in FIG. 1.

The supports 18 and 20 each hold a row 30, 32 of tool carriers. The tool carriers may, in particular, be tool spindles. These may be translatory fixed or moveable. In the exemplary embodiment shown, the support 18 holds four tool carriers 34a, 34b, 34c, 34d. The tool carriers 34a, 34b, 34c, 34d may be tool spindles for example. Tools 36 for machining the workpieces are fixable to these tool carriers. The tool carriers are rigidly mounted on the framework 14 and in particular they are not linearly displaceable.

The row 32 likewise comprises a plurality of tool carriers. Provision may also be made for the transverse support 22 to hold one or more tool carriers 38, 40. The tool carriers 38, 40 can also be arranged in a row parallel to a Z-direction and/or parallel to an X-direction. A row 30, 32 comprises one or more work stations. For example, a first work station is formed by means of the tool carriers 34a, 34b and a second work station is formed by means of the tool carriers 34c and 34d. Two borings can be simultaneously produced in a workpiece in the first work station for example. Two further borings of differing diameter can be simultaneously formed in the second work station for example.

In the case of the exemplary embodiment shown in FIG. 1 wherein tools 36 such as drilling tools are fixed to the tool carriers 34a, 34b, 34c, 34d, the tools are aligned in a line which is substantially parallel to the height direction of the support 18 or 20. In principle, it is also possible for the tools to be aligned in a line which is transverse to this height direction as is shown with the aid of the tool carriers 38, 40.

Figure 2:
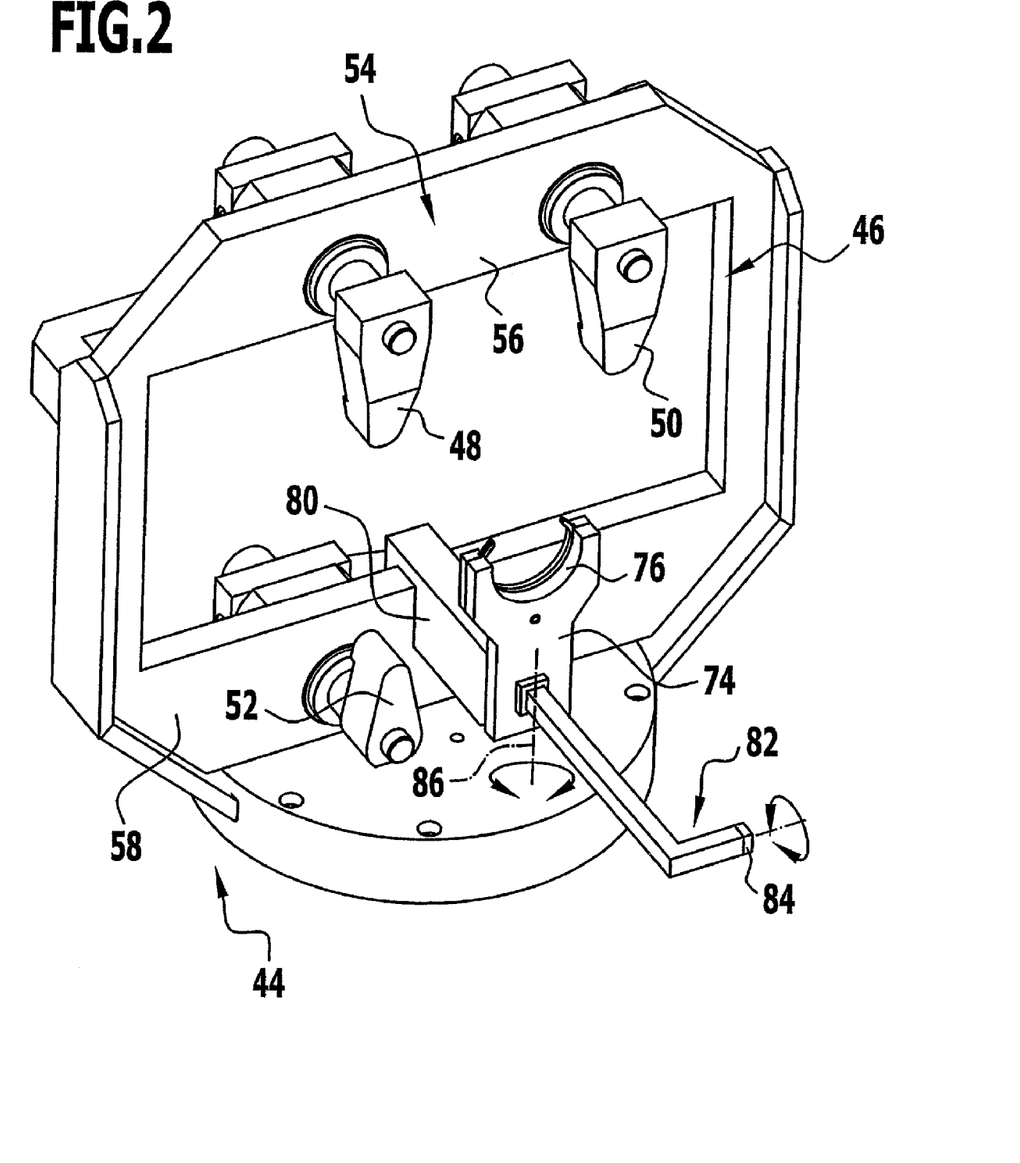
FIG. 2 is a perspective illustration of an exemplary embodiment of a workpiece carrier.

For the purposes of machining in the work space 26, a workpiece 42 is adapted to be positioned with respect to the tool carriers 16 by means of a workpiece carrier 44 (shown in FIGS. 1 and 2). One or more workpieces 42 are fixable on the workpiece carrier 44. To this end, the workpiece carrier 44 comprises a fixing device 46 (FIG. 2). This comprises clamping jaws 48, 50, 52 for clamping a workpiece 42 thereon for example.

In the exemplary embodiment shown in FIG. 2, the workpiece carrier 44 comprises a retaining frame 54 on which the clamping jaws 48, 50, 52 are seated. Hereby, the clamping jaws 48, 50 are seated on a first tie bar 56 of the retaining frame 54 and the clamping jaw 52 is seated on a spaced, oppositely located second tie bar 58 of the retaining frame 54.

Workpieces 42 that are clamped in the workpiece carrier 44 are moveable by means of the workpiece carrier 44 and in particular, they are moveable in the work space 26. To this end, the workpiece carrier 44 is in the form of a workpiece carriage.

For the purposes of guiding the workpiece carrier 44, there is provided a framework 60 which is formed in the manner of a portal. A further framework 62 is guided in linearly displaceable manner on the framework 60 in a vertical direction Y for example. To this end, guide means for the framework 62 are arranged on an inner face of the supports 64, 66 of the framework 60. The framework 60 then forms an "outer" framework and the framework 62 an "inner" framework. This type of guide means is also referred to as a box-in-box concept since the framework 62 is guided as a "box" in the framework 60 which is in the form of a "box".

The workpiece carrier 44 is also guided on the framework 62 in a direction X. This direction X is transverse and in particular perpendicular to the direction Y in which the framework 62 is guided on the framework 60. The direction X is, in particular, a horizontal direction.

The framework 62 comprises oppositely located transverse supports 68, 70 which, in particular, are parallel. Here, these transverse supports 68, 70 are oriented in the X-direction. Guide means for the workpiece carrier 44 are arranged on each of the mutually facing sides of these transverse supports 68, 70 so that the workpiece carrier is then moveable in the direction X. Thereby, a box-in-box concept is again realized since the "box", the workpiece carrier 44, is guided in displaceable manner in the framework 62.

Provision could also be made for the workpiece carrier 44 to be displaceable in a Z-direction which is transverse and in particular perpendicular to the Y-direction and transverse and in particular perpendicular to the X-direction. To this end, there is provided a Z-carriage (spindle sleeve) 72 upon which the workpiece carrier 44 is held. This Z-carriage 72 is then displaceable in the Z-direction, whereby the workpiece carrier 44 is displaceable in the Z-direction. In consequence, the workpiece carrier 44 and the corresponding workpieces 42 held thereby are displaceable in the X-, Y- and Z-direction by the frameworks 60, 62 and the Z-carriage 72.

The displacement movement of the framework 62 on the framework 60, the displacement movement of the Z-carriage 72 on the framework 62 in the X-direction, and the displacement movement of the Z-carriage 72 in the Z-direction are driven by linear motors or ball screws for example.

Provision could also be made for the workpiece carrier 44 to be held on the Z-carriage 72 in rotatable manner (indicated by R in FIG. 1) with an axis of rotation which is aligned in parallel with the Z-direction. In particular, arbitrary angles of rotation of the workpiece carrier 44 with respect to the Z-carriage 72 can be set. To this end, the workpiece carrier 44 is mounted via a rotary bearing on the Z-carriage 72 and an appropriate drive for producing the rotary movement is provided. A workpiece 42 can then be positioned by the workpiece carrier 44 in any (X, Y, Z) position in the work space 26 and furthermore, it can be positioned at any angular position with respect to the axis of rotation of the workpiece carrier 44 in the work space 26.

In accordance with the invention, provision is made for a tool holding device 74 (tool retaining device) to be connected to the workpiece carrier 44 and, in particular, to be connected thereto in a releasable manner. The tool holding device 74 comprises one or more tool seatings 76 into which a respective tool 78 (FIG. 1) can be inserted. An inserted tool 78 can then be moved or rotated by the workpiece carrier 44 along the axes of movement of the workpiece carrier 44.

An automated tool changing process can be carried out by the tool holding device 74. The workpiece carrier 44 together with the tool holding device 74 is driven towards a corresponding tool carrier 16. The workpiece carrier 44 is moved in such a way that a tool fixed to the corresponding tool carrier 16 lies in the tool seating 76. The tool is released and removed from the tool carrier by an appropriate translatory movement. The released tool can then be conveyed from the work space 26 by the movement of the workpiece carrier 44. A new tool is inserted into the tool seating 76 and moved to the appropriate tool carrier 16 and there, it is fixed once more. An automatic change of tool can thus be carried out without an operator having to gain access to the work space. In particular hereby, provision is made for the Z-carriage 72 to be driven out from the work space 26 to such an extent that a tool can be removed from the tool seating space 76 of the tool holding device 74 in a simple manner or a new tool 78 can be inserted into the tool seating 76 in a simple manner. The axes of movement of the tool holding device 74 are the axes of movement of the workpiece carrier 44 so that the tools held by the tool holding device 74 are adapted to be moved into any position to which the workpieces can also be moved.

In one embodiment, provision is made for the tool holding device 74 to be fixed and held on the retaining frame 54 in releasable manner. In the case of the exemplary embodiment shown in FIG. 2, the tool holding device 74 is fixed and held on the second tie bar 58 of the retaining frame 54 in releasable manner. To this end, the tool holding device 74 comprises a retaining element 80 for the purposes of fixation to the retaining frame 54. The retaining element 80 in turn holds the tool seating 76. It is thereby possible to remove the tool holding device 74 from the workpiece carrier 44 for the process of machining the workpieces 42 so that the tool holding device 74 does not interfere during the machining operations. For the purposes of changing a tool, the tool holding device 74 is fixed to the retaining frame 54. For example, the tool holding device 74 is plugged into it. It is preferable that no workpiece 42 be fixed on the workpiece carrier 44 during the change of tool.

A tool releasing device/tool fixing device 82 can be arranged on the workpiece carrier 44. This is arranged on the tool holding device 74 in the exemplary embodiment shown in FIG. 2. The tool releasing device and the tool retaining device can be formed by a single device. An effect can be produced by the tool releasing device/tool fixing device 82 on one or more fixing elements of a tool carrier, and in particular a tool spindle, in order to actuate this in such a way that a fixed tool is released for subsequent removal or an inserted tool is fixed. The tool releasing device/tool fixing device comprises a moveable head 84 for accessing a relevant fixing element of a tool carrier for example.

Provision may be made for the tool releasing device/tool fixing device 82 to be arranged such that it is pivotal about an axis 86. The tool releasing device/tool fixing device 82 can thereby be moved from a storage position into an operative position and vice versa. An operative position is shown in FIG. 2.

By virtue of the solution in accordance with the invention, an automatic change of tool can be carried out in a simple manner. Tools 78 can be supplied to the tool carriers 16 or removed therefrom by means of the workpiece carrier 44 and the tool holding device 74 connected thereto. Due to the mobility of the workpiece carrier 44, appropriate movements can also be effected for the purpose of fixing tools 78 to the corresponding tool carriers 16 or for releasing them from the corresponding tool carriers 16. For tool changing purposes, one does not then have to insert one's hand into the work space 26. For example, the cover 28 does not have to be opened. It is also possible to change a tool even when the spatial conditions are cramped.

Given appropriate mobility of the workpiece carrier 44, the tool holding device 74 can be driven out from the work space 26 to an extent such as to provide easy accessibility for the process of inserting a tool into the tool seating 76 or for extracting a tool from the tool seating 76. The tool holding device 74 can then also be fixed to the workpiece carrier 44 or removed therefrom in a simple manner.

Figure 3:
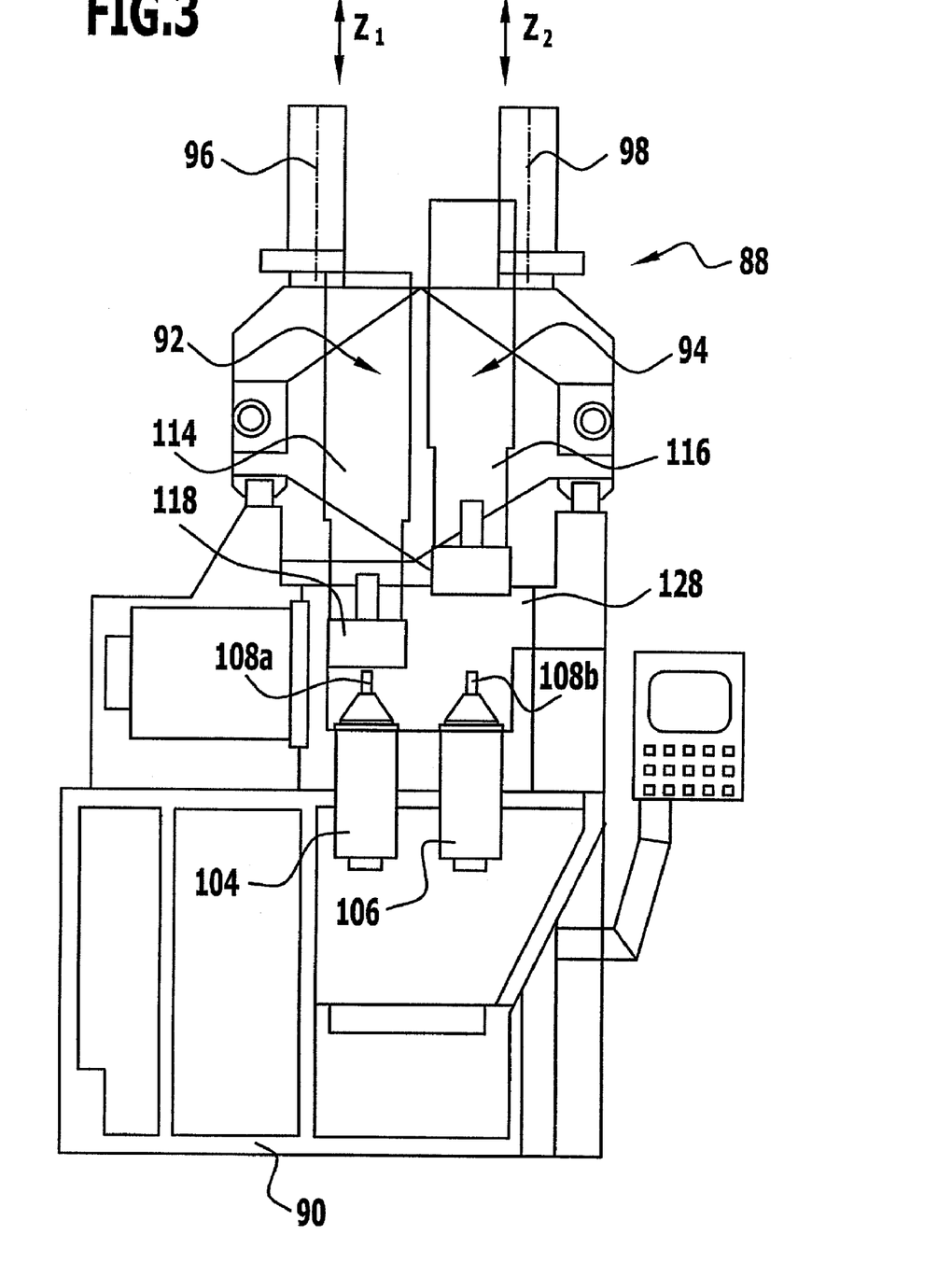
FIG. 3 is a front view of a second exemplary embodiment of a machine tool in accordance with the invention.
Figure 4:
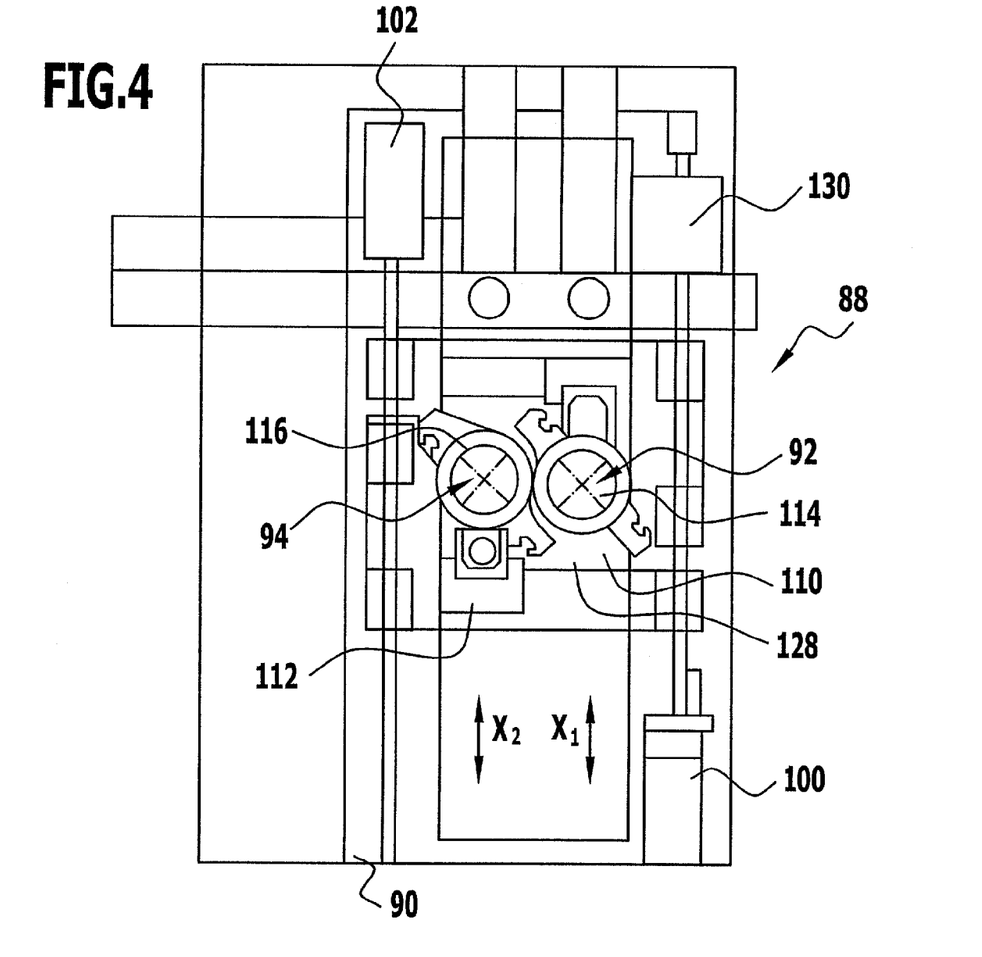
FIG. 4 is a plan view from above of the machine tool in accordance with FIG. 3.

In a further exemplary embodiment of a machine tool in accordance with the invention, which is shown in FIGS. 3 and 4 and bears the reference 88 therein, a first workpiece carrier 92 and a second workpiece carrier 94 are arranged in moveable manner on a machine frame 90. The workpiece carriers 92, 94 are designed, in particular, as spindles. The first workpiece carrier 92 is moveable, in particular, in a vertical direction $Z_1$. An appropriate first drive 96 is provided for this purpose. In the same way, the second workpiece carrier 94 is moveable, in particular, in a vertical direction $Z_2$. A second drive 98 is provided for this translatory movement.

Furthermore, the first workpiece carrier 92 is moveable, in particular, in a horizontal direction $X_1$. A third drive 100 is provided for providing the drive for the translatory movement. In the same way, the second workpiece carrier 94 is moveable linearly, in particular, in a horizontal direction $X_2$. A fourth drive 102 is provided for providing the drive for this movement. The directions $Z_1$ and $Z_2$ are parallel to one another. Furthermore, the directions $X_1$ and $X_2$ are parallel to one another.

Workpieces can be positioned relative to tool carriers 104, 106 incorporating appropriate tools 108a, 108b (FIG. 3) by means of the two workpiece carriers 92 and 94. The two workpiece carriers 92, 94 are, for example, held on respective carriages 110, 112 for movement in the $X_1$ and $X_2$ direction. These carriages 110, 112 can be in the form of triangular carriages. Respective workpiece spindles 114, 116 are guided in displaceable manner on these carriages 110, 112 for feeding the workpiece carriers 92, 94 in the $Z_1$ direction and $Z_2$ direction. A corresponding machine tool is described in WO 2004/012888 A1, to which reference is expressly made.

A workpiece can be fixed on the workpiece spindles 114, 116 serving as workpiece carriers 92, 94 either directly or indirectly by means of a respective workpiece holder in order to supply the work piece to the relevant tool carrier 104 or 106 and to hold and position it during the machining thereof.

In accordance with the invention, there is provided a tool holding device 118 (FIGS. 3 and 5) which is fixable to the respective workpiece carriers 92 and 94 and in particular, to the workpiece spindles 114 and 116 thereof. If such a tool holding device 118 is fixed on the associated workpiece carrier 92 or 94, then it can be moved with the workpiece carrier in the $X_1$, $Z_1$ direction or the $X_2$, $Z_2$ direction.

Figure 5:
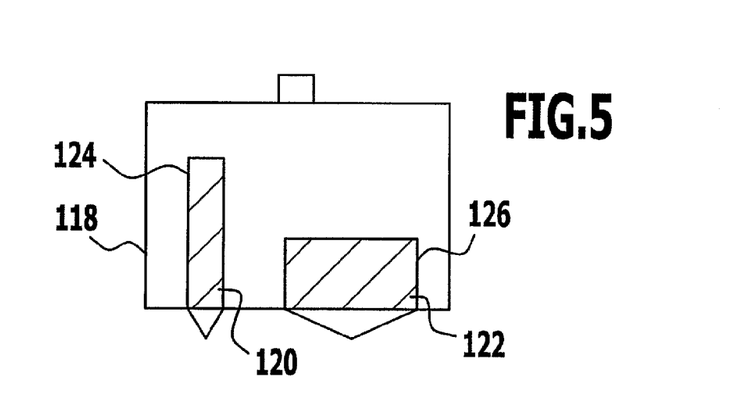
FIG. 5 is a schematic illustration of an exemplary embodiment of a tool holder.

Again, the tool holding device 118 can accommodate one or more tools 120, 122. For example, one or more seatings 124, 126 for corresponding tools 120, 122 are formed or arranged on the tool holding device 118. The appropriate tools 120, 122 that are held on a tool holding device 118 can be moved to the tool carriers 104, 106 by the workpiece carriers 92, 94.

Consequently, a change of tools can be carried out by the workpiece carriers 92, 94. A tool can be removed and a new tool transferred to the corresponding tool carrier 104, 106 by appropriate positioning of the respective workpiece carrier 92, 94 relative to the respective tool carrier 104, 106 by means of the tool holding device 118. Hereby, the axes of movement of the tool holding device 118 are the axes of movement $X_1$, $Z_1$, and $X_2$, $Z_2$ of the workpiece carrier 92 and 94.

An automatic change of tool can be carried out by means of the tool holding device 118 which can be fixed to the workpiece carriers 92 or 94 in place of a workpiece or a workpiece holder. An operator does not have to gain access to a work space 128 when a tool is changed in such a manner. In particular, a door in a work space encasement does not have to be opened.

It is expedient thereby if the machine tool 88 comprises one or more depositing locations 130 for tool holding devices 118. A tool holding device 118 is equipped with the appropriate tools 120, 122 and stored at a depositing point 130. The workpiece carrier 92, 94 can then fetch the appropriate tool holding device 118 from the depositing point 130. In the same way, the appropriate workpiece carrier 92, 94 can deliver a tool holding device 118 to the depositing point 130 after a tool has been exchanged. After a tool holding device 118 has been stored, the appropriate workpiece carrier 92, 94 can pick up a workpiece and supply it to the relevant tool 108a or 108b for machining.

Many modifications and other embodiments of the inventions set forth herein will come to mind to one skilled in the art to which these inventions pertain having the benefit of the teachings presented in the foregoing description. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:

1. A machine tool, comprising:
    a plurality of work stations, wherein each work station comprises at least one tool carrier holding a tool for machining;
    a framework, said at least one tool carrier rigidly mounted on the framework, wherein a plurality of the tool carriers is arranged in a row and a plurality of rows is provided;
    at least one moveable workpiece carrier with which one or more workpieces are positionable for machining, said workpiece carrier moveable between the rows;
    wherein a tool holding device is mounted on the at least one workpiece carrier.

2. A machine tool in accordance with claim 1, wherein the tool holding device is moveable by the associated workpiece carrier.

3. A machine tool in accordance with claim 1, wherein axes of movement of the tool holding device are axes of movement of the at least one workpiece carrier.

4. A machine tool in accordance with claim 1, wherein the tool holding device is positionable with respect to the at least one tool carrier by the at least one workpiece carrier for the purpose of changing tools.

5. A machine tool in accordance with claim 1, wherein the tool holding device is fixable to the at least one workpiece carrier in a releasable manner.

6. A machine tool in accordance with claim 5, wherein the tool holding device is adapted to be plugged onto the at least one workpiece carrier.

7. A machine tool in accordance with claim 1, wherein the at least one workpiece carrier is moveable in a first direction.

8. A machine tool in accordance with claim 7, wherein the at least one workpiece carrier is moveable in a second direction which is transverse to the first direction.

9. A machine tool in accordance with claim 8, wherein the at least one workpiece carrier is moveable in a third direction which is transverse to the first direction and transverse to the second direction.

10. A machine tool in accordance with claim 1, wherein the at least one workpiece carrier is rotatable.

11. A machine tool in accordance with claim 1, wherein at least one of a tool releasing device and a tool fixing device is connected to the at least one workpiece carrier.

* * * * *

UNITED STATES PATENT AND TRADEMARK OFFICE
CERTIFICATE OF CORRECTION

PATENT NO. : 7,442,154 B2 Page 1 of 1
APPLICATION NO. : 11/620851
DATED : October 28, 2008
INVENTOR(S) : Boehler et al.

It is certified that error appears in the above-identified patent and that said Letters Patent is hereby corrected as shown below:

On the Title Page, Item (56)

Page 2 Of Patent:

U.S. PATENT DOCUMENTS

Column 1 - 5th Reference:  "2005/0139049 A1  6/2005  Feinauer et al." should read
--2005/0139048 A1  6/2005  Feinauer et al.--

Signed and Sealed this

Twenty-fourth Day of February, 2009

JOHN DOLL
*Acting Director of the United States Patent and Trademark Office*